United States Patent [19]

Dunbar

[11] Patent Number: 4,794,365

[45] Date of Patent: Dec. 27, 1988

[54] PRESSURE SENSOR

[75] Inventor: John H. Dunbar, Swindon, England

[73] Assignee: Raychem Limited, Swindon, United Kingdom

[21] Appl. No.: 914,701

[22] Filed: Oct. 2, 1986

[30] Foreign Application Priority Data

Oct. 2, 1985 [GB] United Kingdom ............... 8524237

[51] Int. Cl.⁴ .................................................... H01C 10/10
[52] U.S. Cl. .................................................. 338/99; 338/47; 338/114
[58] Field of Search .................... 338/13, 47, 92, 99, 338/114, 220; 339/60 C, 60 M, 60 R, 59 M; 428/119

[56] References Cited

U.S. PATENT DOCUMENTS

| | | | |
|---|---|---|---|
| 3,908,461 | 9/1975 | Turpen | 338/41 X |
| 4,199,637 | 4/1980 | Sado | 428/119 |
| 4,295,699 | 10/1981 | DuRocher | 338/99 X |
| 4,361,799 | 11/1982 | Lutz | 324/52 |

FOREIGN PATENT DOCUMENTS

| | | |
|---|---|---|
| A133748 | 3/1985 | European Pat. Off. |
| 624565 | 6/1949 | United Kingdom |
| 826730 | 1/1960 | United Kingdom |
| 1505819 | 3/1978 | United Kingdom |
| 1544856 | 4/1979 | United Kingdom |
| 2105082 | 8/1981 | United Kingdom |
| 2115555 | 9/1983 | United Kingdom |
| 2115556 | 9/1983 | United Kingdom |

*Primary Examiner*—E. A. Goldberg
*Assistant Examiner*—M. M. Lateef
*Attorney, Agent, or Firm*—Herbert G. Burkard; Simon J. Belcher

[57] ABSTRACT

A coaxial cable pressure sensor having a partially conductive layer of fibres or particles between the inner and outer coaxial conductors whereby pressure applied to the sensor produces a detectable change in resistance of the circuit passing through the partially conductive layer. One or more of the sensors may be incorporated into a vehicle weighing system, preferably in the form of a portable "mat" which may be folded or rolled up.

15 Claims, 3 Drawing Sheets

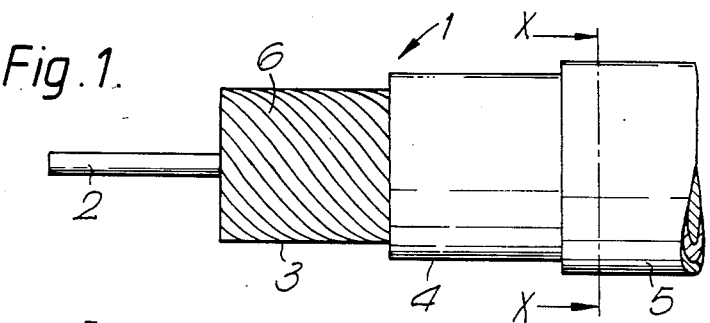
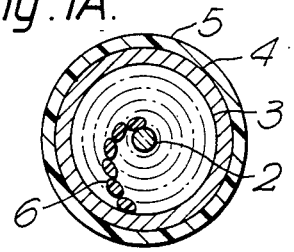
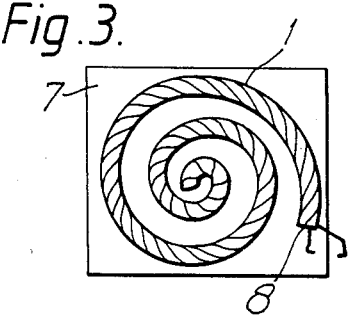
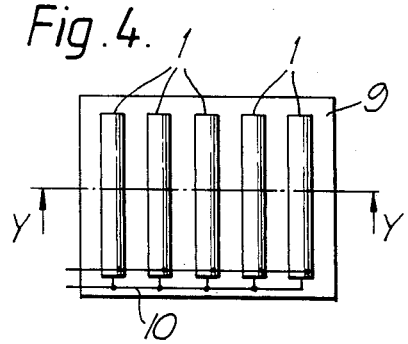
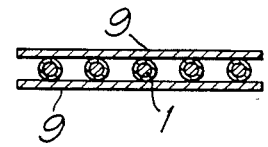
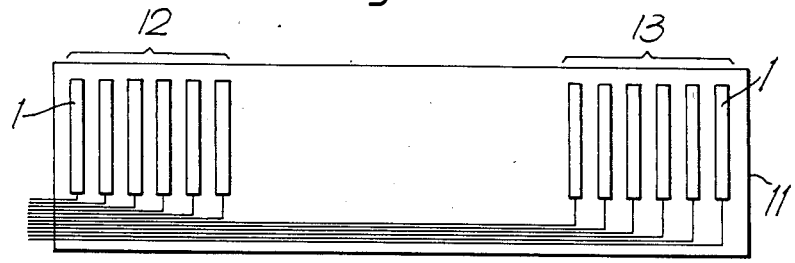

PRESSURE SENSOR

This invention relates to pressure sensors.

Pressure sensors are useful in a number of industrial applications, for example as burglar alarms, pressure sensitive mats for door actuators, in detecting the passage of vehicles, for example to measure traffic density, and in vehicle weighing.

One known type of pressure sensor, as described in UK Pat. No. 1,544,856, for detecting the passage of vehicles is a coaxial cable, the inner and outer electrical conductors being separated by a layer of piezo-electric polyvinylidene fluoride material. When pressure is applied externally to the cable the cable deforms and the polyvinylidene fluoride produces a transient electrical signal between the two conductors.

Another type of pressure sensor for use in security systems, and vehicle detection and weighing is described in UK Pat. No. 1,505,819 and comprises a coaxial cable wherein the inner and outer conductors are in a spaced apart relationship such that when pressure is applied externally to the cable there is a measureable change in capacitance between the two conductors.

U.S. Pat. No. 3,794,790 discloses an electrical switch comprising a conductive wire, a resilient deformable insulating sheath loaded with conductive particles surrounding the conductive wire, and a conductive braid surrounding the sheath. Deformation of the switch at any point along its length, in a manner to move the braid towards the wire, renders the sheath conductive, so that an electrically conductive path is established between the deformed region of the braid and the wire. The switch can be used to control a bell or buzzer in a warning system or to control a counter in a traffic monitoring system.

In UK Patent Application No. 2,105,082A a load sensing mat is described comprising two metal capacitance plates with a layer of resilient dielectric material, which may be filled with carbon particles, between them. When pressure is applied to one of the plates the change in capacitance between the plates is measured.

A pressure-sensitive elastomeric transducer is described in Report by the Department of Transportation, USA, No. FHWA-RD-75-33, November 1974 by J. W. Fothergill, H. D. Childers and M. A. Johnson, entitled "Feasibility of Utilizing Highway Bridges to Weigh Vehicles in Motion", Vol. 1, pp. 78–82. The transducer comprises a material such as silicone rubber or polyurethane foam in which particulate carbon is suspended, and is in the form of a pad. Expansion or compression of the transducer material causes a change in the resistance of the material.

The above pressure sensors are often disadvantageous in that the pressure or load is not measured very accurately. For example, when a transducer material such as carbon-filled silicone rubber or polyurethane foam is used, long-term drift of the resistance can occur after a load has been applied to the sensor, because of compression set of the material. Therefore many commercially used vehicle weighing systems comprise load cells containing resistance strain gauges. These systems have the disadvantage that they are bulky, expensive and require regular maintenance.

In one aspect the present invention provides a pressure sensor comprising an inner electrical conductor at least partly surrounded by a partially resistive layer comprising either fibres, or particles in the substantial absence of a continuous solid binder, which layer is at least partly surrounded by an outer electrical conductor, the fibres being arranged to provide an electrical circuit between the inner and outer conductors such that when pressure is applied to the sensor and compresses the partially resistive layer between the inner and outer conductors, a resulting change in the electrical resistance of the said circuit through the partially resistive layer is detectable via the said conductors.

In another aspect the present invention provides a pressure sensor comprising an electrical conductor at least partly surrounded by a partially resistive layer comprising particles in the substantial absence of a continuous solid binder, which layer is at least partly surrounded by an outer electrical conductor, the particles being arranged such that when pressure is applied to the sensor to move the outer conductor towards the inner conductor and compress the partially resistive layer, a detectable change in electrical resistance between the inner and outer conductor is produced.

The invention will be described with reference to both aspects of the invention unless otherwise stated.

The change in electrical resistance following the application of pressure to the sensor may be detected by connecting the inner and outer conductors to any suitable detecting means, the particular detecting means chosen depending upon the particular application of the sensor.

It is preferred that the fibres or particles comprise partially resistive material, and preferably the partially resistive layer comprises a plurality of fibres or particles distributed in a radial sense from the inner to the outer conductor. When pressure, usually in the form of a load, is applied to the sensor and moves the outer conductor towards the inner conductor, the partially resistive layer is compressed which urges the fibres or particles into closer electrical contact with one another in the radial sense, thereby causing a decrease in electrical resistance between the inner and outer conductors.

It is preferred that the sensor is in the form of a coaxial cable, with the partially resistive layer between the inner and outer conductors.

When the partially resistive layer comprises particles, this particulate layer is analogous to the mineral insulating layer in a mineral insulated cable, except that the insulating particles are replaced by partially resistive particles, such as graphite powder or silicon carbide. The medium surrounding the particles in the layer is preferably air, although any other suitable fluid medium, such as silicone grease, oils or other lubricants or gels, especially hydrophobic gels, may be used, and an anti-oxidant may be included to extend the life-time of the particles.

Preferably, however, the partially resistive layer is in the form of fibres. These fibres may be of any dimensions and may surround the inner conductor in one of a number of forms, for example as a mesh of short-length fibres or in bundles of long-length fibres, but it is preferred that the fibres are in the form of a yarn, and preferably this yarn is helically wrapped around the inner conductor. It is also preferred to surround the inner conductor with two or more layers of the yarns to increase the number of fibres in the radial direction between the inner and outer conductors and thus increase the number of contact points in the layer of partially resistive particles which produce the detectable change in electrical resistance when pressure is applied to the sensor. Any suitable solid or fluid medium may surround the individual fibres and/or the yarns. Again, this is usually air but may also be any of the other mediums as stated above for use with the partially resistive particles. In addition the fibres and/or yarns may be surrounded by a polymeric layer, provided this layer is sufficiently thin so as not to adversely effect the capability of the layer of partially resistive material to produce a detectable change in resistance when pressure is applied to the sensor. For example the yarns may be first wound around the inner conductor and a setting fluid then applied to the yarns.

It is preferred that the partially resistive material is selected such that when pressure is applied to the sensor the partially resistive layer is deformed and produces the detectable change in electrical resistance, and when the pressure is released the partially resistive layer recovers substantially to its original state and original electrical conductivity.

Therefore it is preferred that the partially resistive material comprises a hard elastic material. By "hard" is meant a Rockwell Hardness of greater than R100 measured in accordance with ASTM D785, and the preferred elastic modulus for the material is greater than $2 \times 10^5$ pounds per square inch (1380 Megapascals). The use of hard elastic materials, especially fibres, is advantageous in that substantially linear response may be achieved and the sensor suffers less permanent resistance drift after loading, since compression set in the material is much reduced compared, for example, with elastomeric material. Since the thickness of the hard elastic material may be small compared with that of elastomeric material, high spatial resolution is possible which is advantageous when a number of the sensors are used together in an array. When the material comprises refractories or high melting point organic fibres high operating temperatures are possible.

Examples of preferred materials for the layer of partially resistive material include fibres of carbon, partly carbonised polyacrylonitrile or silicon carbide; or textile fibres e.g. cotton, glass, Kevlar (Trade Mark) coated or loaded with electrically partially resistive material, for example carbon particles or partially resistive polymer material (e.g. polypyrrole suitably doped). The partially resistive material may be deposited on the textile fibres either before or after they are wrapped around the inner conductor. For example a mass of such fibres (e.g. a yarn) may have suitable particles interspersed therein.

In order to connect the sensor to a suitable detecting means for measuring changes in resistance, it is preferred that the resistance between the inner and outer conductors when a load is applied to the sensor is between $10^0$ and $10^7$ ohms, and more preferably between $10^2$ and $10^5$ ohms. In general the resistance of the sensor is governed by a combination of the resistivity of the partially resistive layer and the dimensions of the sensor. Preferably the electrically partially resistive layer has a resistivity at least 10 times greater than, preferably 1000 or more times greater than that of the inner or outer conductor whichever has the higher resistivity. Advantageously, the resistivity of the partially resistive layer in the sensor of the present invention, measured under 1 atm pressure, is at most $10^{11}$ ohm cm, preferably between $10^{-3}$ and $10^{11}$ ohm cm, more preferably between $10^1$ and $10^9$ ohm cm, and especially between $10^4$ and $10^6$ ohm cm. The resistivity of the fibres or particles themselves is also preferably within the above-stated ranges.

Between the inner and outer conductors of the sensor according to the present invention there may be solely the partially resistive layer. Alternatively one or more additional layers may be included between the two conductors, for example the partially resistive layer may be surrounded by a thin conductive polymeric layer. This layer may be heat-shrunk or extruded around the partially resistive layer and may be continuous or discontinuous along the length of the sensor.

In another embodiment a layer of insulating material may be included between the partially resistive layer and the outer conductor along part of the length of the sensor where it is not required to act as a sensor. For example, it may be desired to connect the inner and outer conductors of the sensor to the electrical circuitry at a point some distance from the actual sensor in order to prevent the connection from being damaged by the load applied to the sensor or to avoid having a non-uniform sensor profile due to the larger size of the connection compared with the sensor, for example. One solution is to extend the coaxial cable sensor to the point where it is to be connected to the circuity but de-sensitise this extended portion, to prevent undesired pressures from being sensed, by providing the extended portion with an insulating layer between the partially resistive layer and the outer conductor.

The inner conductor in the sensor may comprise single or multi-stranded wires and suitable materials include stainless steel, tinned copper and carbon fibre. The material and diameter of the inner conductor will depend upon the application, and in particular the range of pressures to be measured by the sensor. For example, where the inner conductor is surrounded by a layer of polyacrylonitrile fibrous partially resistive material a 0.1 mm diameter stainless steel inner conductor may be chosen where an average normal force of between 100N/m to 1000N/m is to be applied to the sensor, whereas a 1 mm diameter stainless steel conductor may be chosen for an average normal force of between 1000N/m to 10,000N/m.

The outer conductor may comprise, for example, a continuous layer, a braid, a tape wrap or a mesh, provided that it is resiliently deformable such that it depresses towards the inner conductor when a pressure is applied to the sensor. A braid is generally preferred. Suitable materials for the outer conductor include stainless steel and tinned copper. Usually the outer conductor is continuous along the length of the sensor, although in an alternative embodiment of the invention the outer conductor may be discontinuous along the length of the sensor, for example in the form of rings of conductive braid, to provide a number of discrete regions along the sensor, each discrete region being capable of being sensed separately from the other regions by individually electrically addressing the outer conductor of each discrete region that it is desired to sense.

The outer conductor is preferably surrounded by an outer jacket, such as an insulating polymeric jacket, to give mechanical protection to the sensor and to prevent ingress of moisture or other contaminants.

The pressure sensor according to the present invention may be used as one single length of coaxial cable. Alternatively two or more of the sensors may be arranged together to provide, for example, a two-dimensional array of parallel, spaced apart sensors. Each sensor in the array may be individually electrically connected to a detecting means, or two or more of the sensors may be electrically connected together in parallel or in series or in a parallel series network, and these sensors connected to a single detecting means.

The sensor according to the invention can be used in a variety of applications as any load or impact within the detectable range of the sensor can be sensed and measured by the sensor. Examples of suitable applications include warning systems, security systems, and in seismic surveys. The sensor is particularly useful in traffic monitoring, especially vehicle weighing. For example a weighing system comprising one or more of the sensors according to the invention arranged as a mat or pad could measure the load of a vehicle, and could be adapted to measure the load at each axle to determine the weight distribution of the vehicle load, rather than just the total load of the vehicle as measured by most currently used weighing systems. The sensor is also advantageous in that it is lightweight and has a low profile and thus may be used as a portable weighing system, for example as a load sensing mat that can be folded or rolled up. By laying a pressure sensor according to the invention across a road a traffic census could be carried out measuring, for example, vehicle axle weight and weight distribution as described above, tyre width, spacing between vehicles and vehicle speed.

Where the outer conductor of the sensor is discontinuous along the length of the sensor, the sensor is useful, for example, in measuring the level of contents in a container, for example a grain silo. If the sensor is positioned vertically inside the container and each discrete region of the outer conductor of the sensor is addressed separately then the regions of the sensor, and hence the length of the sensor, which are immersed in the contents of the container would produce a change in electrical resistance due to the pressure applied to those regions by the contents, and the proportion of the length of the sensor in which a change in resistance occurs would directly indicate the level of the contents in the container. Another application of this embodiment of the invention is again in traffic monitoring. A sensor layed across a road would be particularly advantageous in measuring tyre width and wheel spacing, for example.

Various embodiments of the invention will now be described, by way of example only, with reference to the accompanying drawings in which:

FIG. 1 is a cut-away side view of a coaxial pressure sensor according to the present invention;

FIG. 1A is a cross-section of the sensor of FIG. 1 taken through the line X—X;

FIG. 3 shows a weighing pad comprising a sensor according to the present invention;

FIG. 4 shows another weighing pad comprising a sensor system according to the present invention;

FIG. 4A is a cross-section of the sensor system of FIG. 4 taken through the line Y—Y;

FIG. 5 shows a vehicle weighing strip incorporating a sensor system according to the present invention.

Figure 2:
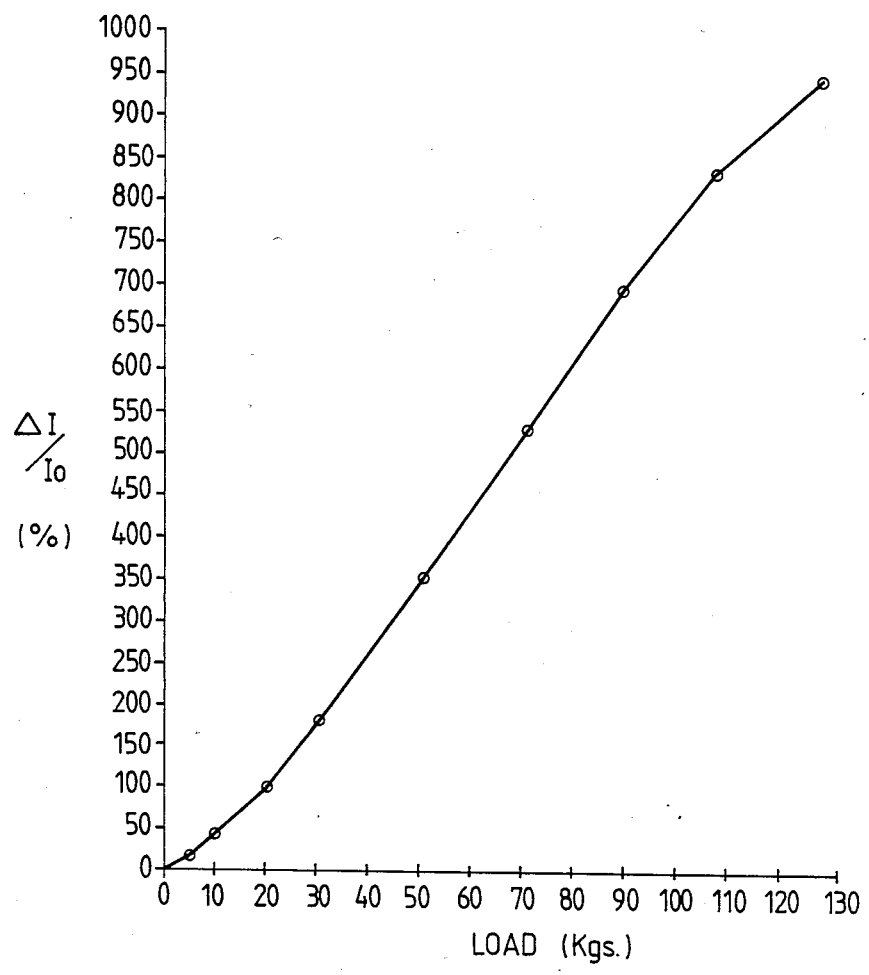
FIG. 2 is a graph showing the percentage change in electrical current between the inner and outer conductors of the sensor of FIG. 1 for a fixed voltage with increasing load applied to the sensor.

Referring to the drawings FIG. 1 shows a typical pressure sensor 1 according to the present invention in coaxial cable form and comprises an inner conductor 2 surrounded by a layer 3 of helically wound partially resistive yarns 6, which in turn is surrounded by an outer conductor 4. A protective jacket 5 surrounds the outer conductor 4. A thin layer of conductive polymer (not shown) may optionally be included between the partially resistive layer 3 and the outer conductor 4. The partially resistive layer 3 comprises a number of layers of the yarns 6 as shown schematically in the cross-section of the sensor in FIG. 1A, and the inner conductor 2 is uniformly surrounded by the partially resistive yarns 6.

An example of suitable materials for and dimensions of the pressure sensor of FIG. 1 is as follows:

EXAMPLE 1

Inner conductor 2: a 1 mm diameter wire comprising strands of 0.05 mm diameter stainless steel wire.

Partially resistive layer 3: six layers of spun yarn of approximately 900 decitex helically wrapped around the inner conductor 2, each yarn comprising lengths of 10 micron diameter oxidised polyacrylonitrile staple fibres twisted together. After winding the yarns around the conductor the yarns are partially pyrolysed to render them partially resistive by passing the wrapped conductor through a tube furnace at 700° C. in a nitrogen atmosphere. The speed of the passage of the wrapped conductor through the furnace determines the resistivity of the partially resistive layer, the required resistivity depending upon the application of the sensor and the electronics connected to the sensor in use to detect the change in resistance.

Conductive layer: (optional) a 150 micron thick coating of a carbon-filled conductive plastics compound such as Cabolac 887 (trade name—available from Cabot) melt extruded over the partially resistive layer 3.

Outer conductor 4: tinned copper wire braided over the partially resistive layer 3 (or the conductive layer when present).

Protective jacket 5: a polyethylene or polyvinylidene fluoride jacket extruded over the outer conductor. Alternatively, and usually when short lengths of the sensor are required, the protective jacket may be a heat-shrinkable jacket which is recovered onto the outer conductor.

In use the pressure sensor is connected to suitable electric circuitry (not shown) to measure the change in electrical resistance between the inner and outer conductors when a pressure, usually in the form of a load, is applied to the sensor. FIG. 2 shows the percentage change in current due to a change in resistance between the two conductors with increasing load applied to a 15 cm length of sensor as shown in FIG. 1 comprising the materials and dimensions as stated in the above example. For example, when no load is applied the resistance between the inner and outer conductors was 4.25 k/ohms and with an applied load of 126 kgs the resistance was 0.40 k/ohms.

One particularly useful feature of the coaxial sensors according to this invention is the substantially linear response with load (as shown in FIG. 2). One consequence of this is that the sensor acts as a "load integrator". In other words the output expressed in terms of $\Delta I/I_o$ for a given voltage applied between centre and outer conductors, represents the summation of all the loads applied down the length of the coax, irrespective of their position.

The pressure sensor may either be used as a single length, for example a length of the sensor as shown in FIG. 1 may be laid across a road to monitor traffic movements, or two or more of the sensors may be arranged together in an array to form a pressure sensor system.

FIG. 3 shows an application of a single length of pressure sensor for use, for example, as a weighing pad. The pressure sensor 1 is wound into a spiral and sandwiched between two plates 7 (upper plate not shown) such as metal plates. The inner and outer conductors of one end 8 of the sensor are connected to suitable electrical circuitry so that when a load is applied to the sensor, for example a wheel of a vehicle is driven onto the sensor, the sensor is compressed along its length to move the outer conductor towards the inner conductor and thus urge the fibres and yarns into closer electrical contact with eachother to produce a measurable decrease in resistance from which the weight of the applied load can be calculated. The range of loads that can be measured by the weighing pad can be adjusted by altering the length of the sensor.

FIGS. 4 and 4A show another embodiment of the invention suitable for use as a weighing pad. A number of pressure sensors 1 as shown in FIG. 1 are arranged in a parallel array and sandwiched between two plates 9. The sensors 1 are electrically connected in parallel by connecting each sensor 1 to a connecting conductor 10, and in use the conductor 10 is connected to suitable electrical circuitry to enable the weight of an applied load to be determined as described above with reference to FIG. 3.

Figure 6:
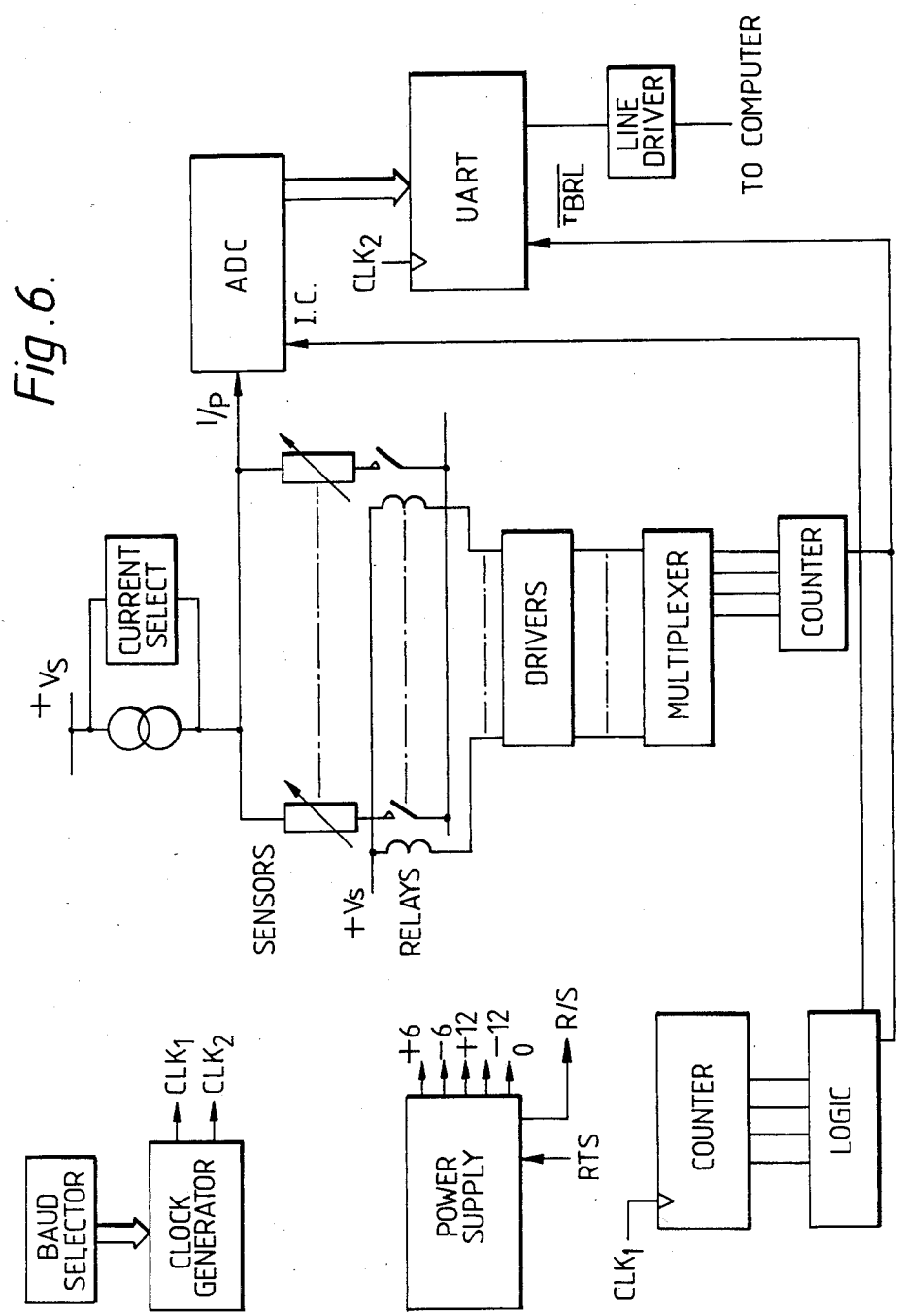
FIG. 6 is a flow diagram showing typical electric circuitry used for detecting a change in resistance when a load is applied to the sensor system of FIG. 5.

FIG. 5 shows a pressure sensor system suitable for determining the weight distribution over each wheel in a vehicle axle. The sensor system comprises a number of sensors 1 as shown in FIG. 1 arranged in a two-dimensional parallel array which are attached to a support 11, or alternatively may be enclosed in a casing (not shown). The support or casing may be of any suitable material such as metal or plastics, but is preferably a flexible material such as a laminated woven plastics material, so that the sensor system may be rolled up when not in use, thus providing a portable vehicle weighing strip. The sensors 1 may be spaced regularly along the support 11 (or casing) or may be in groups with spaces along the support where the strip is not required to sense pressure each group usually comprising between ten and forty individual sensors. In FIG. 5 the sensors 1 are arranged in two groups 12 and 13, each group being capable of receiving a wheel or group of wheels at one end of a vehicle axle. The inner conductors of each sensor 1 are connected individually via connecting wires 15 to electrical circuitry for measuring any change in resistance when pressure is applied to the sensors so that each sensor may be measured separately (the outer conductors of the sensors 1 may be connected to the circuitry via a single connecting wire 16). A flow diagram of suitable circuitry for addressing a number of individual sensors, such as in the sensor system of FIG. 5, is shown in FIG. 6. In use a vehicle is driven onto the weighing strip so that one wheel or group of wheels at one end of one axle is positioned over the group of sensors 12 and one wheel or group of wheels at the other end of the axle is positioned over the group of sensors 13. The pressure applied by the wheels to each sensor is then measured and thus the distribution of the vehicle load over each wheel can be determined in addition to the total axle load. Tyre width may also be determined, provided the sensors are spaced sufficiently close together, by measuring the number of sensors which undergo a change in resistance due to pressure applied by the tyre. Tyre pressures could also be calculated using the change in resistance measured by the sensor at the centre of the vehicle footprint (away from the radial stresses in the tyre). This pressure sensor system may be used as a static weighing strip, where the vehicle stops on the sensor, or may be used as a dynamic weighing strip, where the weight and load distribution of the vehicle is determined while the vehicle is in motion. For high speed applications the individual sensors naturally need to be scanned at a much higher rate than for low speed or static applications.

Further examples follow to illustrate the invention.

EXAMPLE 2

Partially resistive cotton fibres

A length of cotton twine (0.2 mm diameter) is rendered partially electrically resistive by soaking in a pyrrole solution in methylene chloride followed by immersing it in ferric chloride solution. The absorbed pyrrole is oxidised and forms polypyrrole which due to the presence of $Cl^-$ counter ions, is electrically partially resistive.

The cotton is dried and is then helically wound onto 22 standard wire gauge tinned copper wire so as to form two layers of cotton.

The outer conductor 4 and protective jacket 5 described in the foregoing Example 1 are then added.

When using doped partially resistive materials, for example doped amorphous silicon, use of a high dopant concentration minimizes the temperature coefficient of resistance, resulting in reduction of the activation energy of electrical conductance, e.g. from ca.0.8 eV (undoped silicon) to ca.0.2 eV (doped silicon). At room temperature this represents a change in the temperature dependence of the resistance from 9.5%/°C. to 2.5%/°C., which is advantageous in all forms of the invention. Low or zero temperature coefficients are accordingly preferred.

I claim:

1. A pressure sensor comprising a coaxial cable having an inner electrical conductor substantially uniformly surrounded by a partially resistive layer comprising either particles in the substantial absence of a continuous solid binder, or fibres, which layer is at least partly surrounded by an outer electrical conductor, the fibres or particles comprising partially resistive material and being arranged to provide an electrical circuit between the inner and outer conductors such that when pressure is applied to the sensor and compresses the partially resistive layer between the inner and outer conductors, a resulting change in the electrical resistance of the said circuit through the partially resistive layer is detectable via said conductors.

2. A pressure sensor according to claim 1, wherein the fibres or particles are elastic to enable the partially resistive layer in use to return substantially to its original state and original electrical conductivity after removal of the applied pressure.

3. A pressure sensor according to claim 2 wherein the fibres or particles have an elastic modulus of at least $2 \times 10^5$ pounds per square inch (1380 Megapascals).

4. A pressure sensor according to claim 1 wherein the fibres or particles have a Rockwell hardness of R100 measured in accordance with ASTM D785.

5. A pressure sensor according to claim 1 comprising the fibres in the form of a yarn or yarns.

6. A pressure sensor according to claim 5 wherein the yarn or yarns are helically wound around the inner conductor.

7. A pressure sensor according to claim 5 wherein the partially resistive layer comprises two or more layers of the yarns.

8. A pressure sensor according to claim 1 wherein a thin conductive layer is positioned between the partially resistive layer and outer conductor along at least a portion of the sensor.

9. A pressure sensor according to claim 1 wherein the fibres or particles are contained in a fluid medium.

10. A pressure sensor according to claim 1 wherein an insulating layer is positioned between the partially resistive layer and one of the conductors to provide de-sensitised regions of the sensor.

11. A pressure sensor according to claim 1 wherein the outer conductor is discontinuous along the length of the sensor to provide discrete regions of the sensor, the said change in electrical resistance in each region being capable of being detected individually.

12. A pressure sensor according to claim 11 wherein means are provided for individually electrically addressing the outer conductor of each discrete region along the length of the sensor.

13. Apparatus for weighing an object which comprises
(1) a power source;
(2) a plurality of sensors which are arranged in a two-dimensional array, ewach of said sensors comprising a coaxial cable having
(a) an inner electrical conductor,
(b) an outer electrical conductor, and
(c) a void-containing resistaive layer which lies between the inner and outer electrical conductors and which comprises a plurality of fibers, the resistance of said layer decreasing when an object to be weighed is placed upon the sensor, and the decrease in resistance being proportional to the weight of the object;
the inner and outer conductors being connected to the power source so that current flows between the conductors and through the resistive layer; and
(3) means for measuring the current which flows between the conductors.

14. Apparatus according to claim 13, wherein the plurality of sensors is incorporated in a fabric forming a portable mat which may be folded or rolled up.

15. A pressure sensor which comprises a coaxial cable having
(1) an inner electrical conductor;
(2) an electrically conductive layer which surrounds the inner conductor and which comprises a yarn wrapped around the inner conductor, the yarn being selected from yarns composed of electrically conductive fibers and yarns comprising electrically conductive particles distributed on fibers; and
(3) an outer electrical conductor which surrounds the electrically conductive layer;
the conductors (1) and (2) and the layer (3) being such that, when the inner and outer conductors are pressed towards each other, the resistance of the conductive layer decreases by an amount which is proportional to the increase in pressure.

* * * * *